(12) United States Patent
Linnig

(10) Patent No.: US 7,013,859 B2
(45) Date of Patent: Mar. 21, 2006

(54) DEVICE FOR DAMPING TORSIONAL VIBRATIONS

(75) Inventor: Karl-Heinz Linnig, Markdorf (DE)

(73) Assignee: Karl-Heinz Linnig GmbH & Co. KG, Markdorf (DE)

( * ) Notice: Subject to any disclaimer, the term of this patent is extended or adjusted under 35 U.S.C. 154(b) by 0 days.

(21) Appl. No.: 10/486,517

(22) PCT Filed: Oct. 30, 2002

(86) PCT No.: PCT/DE02/04045

§ 371 (c)(1),
(2), (4) Date: Feb. 12, 2004

(87) PCT Pub. No.: WO03/047076

PCT Pub. Date: Jun. 5, 2003

(65) Prior Publication Data

US 2004/0231629 A1    Nov. 25, 2004

(30) Foreign Application Priority Data

| Nov. 15, 2001 | (DE) | 101 55 986 |
| Dec. 21, 2001 | (DE) | 101 63 690 |
| Feb. 26, 2002 | (DE) | 102 08 301 |
| Apr. 11, 2002 | (DE) | 102 16 082 |

(51) Int. Cl.
*F02B 75/06*    (2006.01)

(52) U.S. Cl. .................. 123/192.1; 192/54.4; 310/103
(58) Field of Classification Search ............. 123/192.1; 310/103; 192/54.4
See application file for complete search history.

(56) References Cited

U.S. PATENT DOCUMENTS 3,283,588 A    11/1966    Merchant
3,573,517 A     4/1971    Osterstrom

FOREIGN PATENT DOCUMENTS

| DE | 1087275 B | | 8/1960 |
| FR | 1487492 A | | 7/1967 |
| JP | 63001824 A | * | 1/1988 |
| SU | 1467268 | | 3/1989 |
| WO | WO9639957 A | | 12/1996 |

* cited by examiner

*Primary Examiner*—Noah P. Kamen
(74) *Attorney, Agent, or Firm*—Breneman & Georges

(57) ABSTRACT

The invention relates to a device (1) for damping torsional vibrations, having a driving and a driven component (4, 7). Provision is made in this case to provide between the components individual magnets (16, 17) which lie opposite each other and can be displaced in a limited manner with respect to each other in an angular range, the torsional capacity of the two components with respect to each other being limited by mechanical stops (22).

21 Claims, 13 Drawing Sheets

DEVICE FOR DAMPING TORSIONAL VIBRATIONS

CROSS REFERENCE TO RELATED APPLICATIONS

Figure 1A:
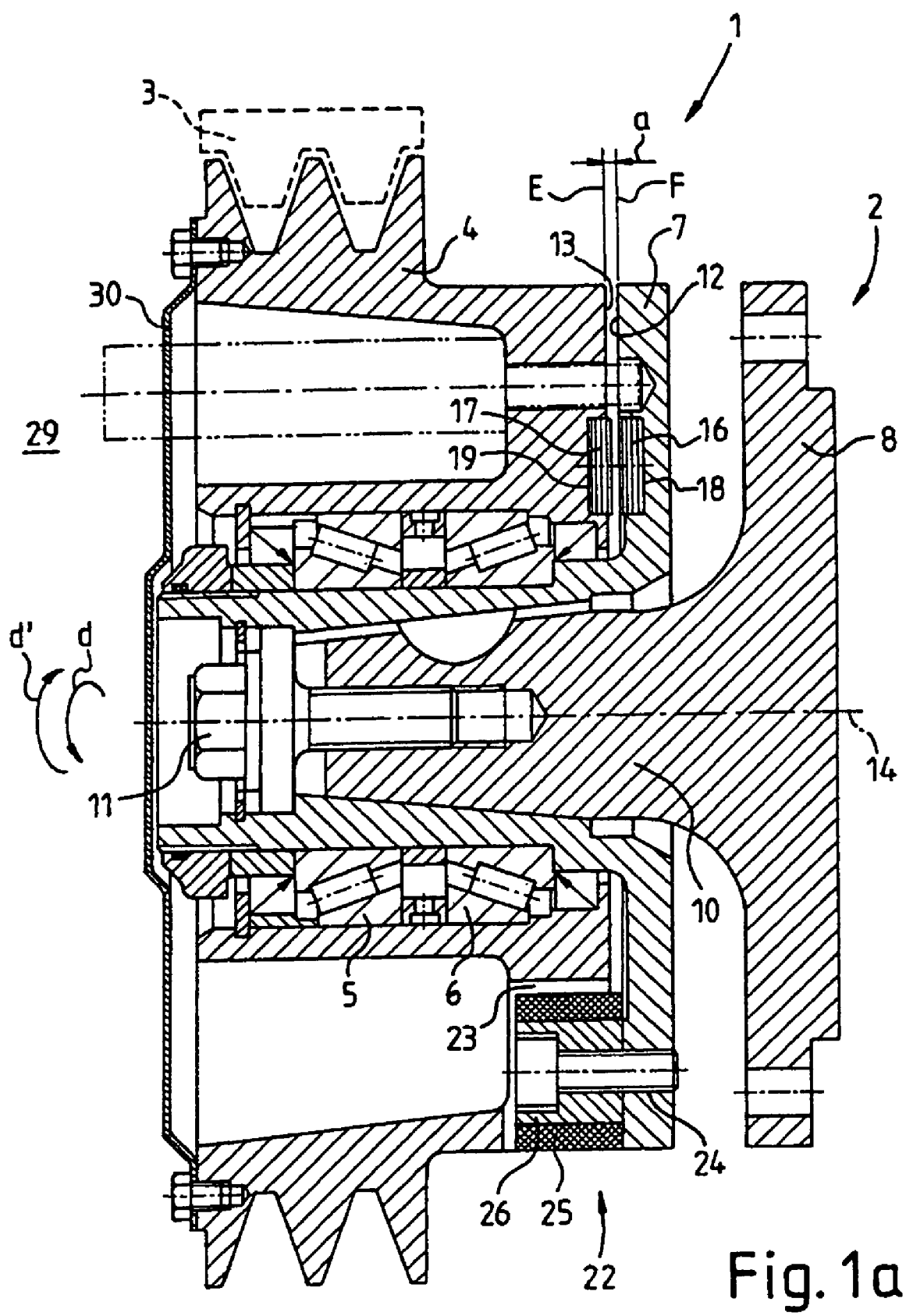

Not applicable.

STATEMENT REGARDING FEDERALLY SPONSORED RESEARCH OR DEVELOPMENT

Not applicable.

INCORPORATION-BY-REFERENCE OF MATERIAL SUBMITTED ON COMPACT DISC

Not applicable.

REFERENCE TO A "MICROFICHE APPENDIX"

Not applicable.

BACKGROUND OF THE INVENTION (1) Field of the Invention

The invention relates to a coupling-free unit for the transmission of torque and damping of torsional vibrations for motor vehicles, boats and other forms of transportation having an internal combustion engine for driving auxiliary assemblies, such as, for example, a fan, a compressor of an air conditioning system, an electric generator, water pump, hydraulic pump, or a compressor for the brake system driven by the internal combustion engine.

The invention furthermore relates to a unit for the contactless transmission of torque and damping of torsional vibrations for motor vehicles and other forms of transportation having an internal combustion engine and a transmission disposed between a wheel or propeller drive, for example the propeller shaft.

(2) Description Of Related Art Including Information Disclosed Under 37 C.F.R. 1.97 and 1.98

Irregular operating states occur frequently in internal combustion engines which have to meet the strict EU requirements for low fuel consumption and low quantity and cleanness of exhaust gas emissions. For example irregular operating states occur at low idling speeds. Generally known, vibration-damping transmission of torques by means of V-belts can no longer sufficiently dampen these irregular operating states. Another complicating factor is that the number of auxiliary assemblies which are required has greatly increased and will increase further. When a number of such auxiliary assemblies interact, superpositions of torsional vibrations may occur, augmented by each individual auxiliary assembly. It is becoming less and less sufficient to dampen by one or more parallel V-belts which permits/permit the transmission of torque from the driven belt pulley on the shaft of the drive to a driving belt pulley on the shaft of the auxiliary assembly. On the one hand, the V-belt has to have high strength in order to be able to transmit the torques and ensure a long service life but on the other hand, it is to be elastic to effectively dampen the torsional vibrations. A V-belt is only able to a limited extent satisfy these contradicting requirements.

A catalog from CENTA discloses, under the trademark Centaflex, a component which comprises two housing halves. Mutually corresponding recesses are arranged on opposite surfaces of the housing parts. One or more specially shaped, elastic plastic parts are inserted into these recesses. These elastic plastic parts take on the transmission of torque, and are intended, according to the manufacturer's instructions, also to carry out sufficient damping of the torsional vibrations. Such a design has the drawback that its elastic plastic parts wear out over the course of time because of the high endurance and transmittal torques combined with vibrations. Such plastic parts first of all lose their initial elasticity and finally disintegrate. The wear is furthermore accelerated by a thermal loading of the plastic parts used for damping; the typical temperatures of between up to −40° C. and +120° C. are common in the vicinity of internal combustion engines. In addition a large variety of types of elastic plastic parts are required having different degrees of hardness for the driving and auxiliary assemblies due to the different frequencies and amplitudes that may occur and which have to be transmitted and damped. The exchange of worn plastic parts results in a high and cost-intensive outlay for maintenance.

BRIEF SUMMARY OF THE INVENTION

The invention is designed to transmit torques of internal combustion engines in a contactless manner to auxiliary assemblies utilizing a simple structural design that can be produced at a reasonable cost. The novel device can transmit torques in the no-load region or in the partial-load region or in the full-load region, while effectively dampening torsional vibrations with low maintenance without wear and preventing superpositions. This unit is not intended to replace the coupling function of a friction or magnetic coupling which has to be actuated intermittently.

Taking the features of a device for dampening torsional vibrations having a driving and a driven component having magnets disposed opposite each other on the drive and driven components as the starting point, this object is achieved by the arrangement of the magnets in axial alignment in a first substantially circular path (15) on substantially flat confronting surfaces on the drive component and driven component and an intermittently contactable carry along disposed in a different circular path. The features of the invention including the arrangement of the magnets, their accommodation of full and partial loads the use of mechanical stops, the dimensioning of the magnet pairs to the carry along mechanism all permit advantageous implementations and developments of the invention.

The device according to the invention for damping torsional vibrations provides two components which can be twisted with respect to each other in a limited manner, have a common geometrical axis of rotation and have, on opposite surfaces, magnets which can be twisted with respect to each other together with the particular component. The limited torsional capacity of the components with respect to each other means that the latter have play or limited freewheeling with respect to each other and in which there is no mechanical contact between them in one direction of rotation or an opposed direction of rotation. In this tolerance band, it is only the forces which act between the magnets which determine the behavior of the components with respect to rotation about the common geometrical axis of rotation. This has the effect of achieving, between the components, a wear-free, contactless coupling which has vibration-damping properties due to the restoring forces of the interacting magnets upon twisting of the components. These vibration-damping properties are not only available during idling, i.e. when rotation is absent, but also during driving, and as long as the forces which act between the magnets are sufficient in order to transmit the supplied torque. This entirely avoids mechanical contact of the components in one direction of rotation, even during operation under load, and therefore achieves optimum decoupling of drive and output.

One advantageous way of implementing the subject matter of the invention is to equip the components with disk-shaped flange surfaces for the arrangement of the magnets which, in particular, are orientated parallel to each other. This provides a large amount of structural space for the arrangement of interacting magnets at an annular region which is at a distance away from the axis of rotation provides an optimum effect for the arrangement of the magnets by providing a large effective lever in this region.

Furthermore, provision is made to provide a gap between magnets which lie opposite each other and interact with each other. This gap permitting, for example, the insertion of pulleys in order to influence the magnetic forces effective between the magnets, which pulleys, in particular, weaken or deflect the field lines. With the insertion of a pulley the device has, for example, slight damping which is desirable under some circumstances for the transmission of small moments.

The invention accommodates the transmission of idling torques and/or partial-load torques by means of the individual magnets (16, 17, 95, 101). This means that subject to a possible peak torque, relatively small dimensioning of the device is sufficient without the device being unsuitable for the transmission of the peak torque. The transmission of the full-load torque or of the peak torque takes place via mechanical stops which act in the direction of rotation, omitting the damping of the vibrations. In an alternative embodiment even when the device is subjected to a full load by cushioning or encasing interacting parts. Given an appropriate configuration of the device, the vibration-damped transmission of peak torques is, of course, also possible. In the case of a device of this type, mechanical stops or drivers are not absolutely necessary.

Furthermore, it is advantageous to limit the play between the two components by means of mechanical stops which are designed as drivers which engage in recesses. This allows for a compact structural form in which mechanical stops can optimally be integrated between parallel pulleys bearing the arrangement of the magnets.

It is advantageous to arrange the magnets in planes which are perpendicular with respect to the axis of rotation of the device. This permits simple manufacturing of the components for receiving the magnets as pulleys. The pulleys have holes arranged concentrically with the axis of rotation for receiving magnets with a circular cross section.

Provision is furthermore made to arrange the magnets in planes in which the axis of rotation of the device is situated. This makes possible the use of structural forms in which the effect of repelling magnets lying opposite each other with the same poles.

In order to obtain a neutral central position, the invention makes provision to arrange attracting magnet pairs which face each other full on the components. This has the advantage of optionally utilizing attracting magnets that are particularly difficult to separate by mutual displacement or twisting about an axis of rotation situated away from the magnets and the existing magnetic forces.

The use of the repelling effect of magnets lying opposite each other with the same poles facing each other is accomplished by means of a device in which the magnets are fastened to a first pulley face the magnets which are fastened to a second pulley with the same poles facing each other.

The invention furthermore makes provision to dimension the limited freewheeling of the carry-along connection, which determines the torsional capacity of the two components. In this manner the magnet pair or the damping unit or the damping cell provide a maximum deflection position, a restoring force, in particular a maximum restoring force, in the direction of the central position. This brings about a device which reacts to heavier loads with greater restoring forces.

The invention also provides for the arrangement of the device in an angular gear mechanism or for its connection upstream or downstream to an angular gear mechanism. In particular this makes it possible to also suppress noises which are produced by tooth flanks striking against one another. The device damps the impacts which the gearwheel receives from gearwheels which are in engagement with it. Furthermore, the gearwheel which is directly assigned to the device is also decoupled from the gearwheels of a shaft connected to the device.

The use of an angular gear mechanism in combination with the device is particularly advantageously employed between an internal combustion engine and a fan wheel since the device has a damping effect on nonuniform operating states originating from the internal combustion engine and from the fan wheel.

BRIEF DESCRIPTION OF THE SEVERAL VIEWS OF THE DRAWING(S)

Figure 1B:
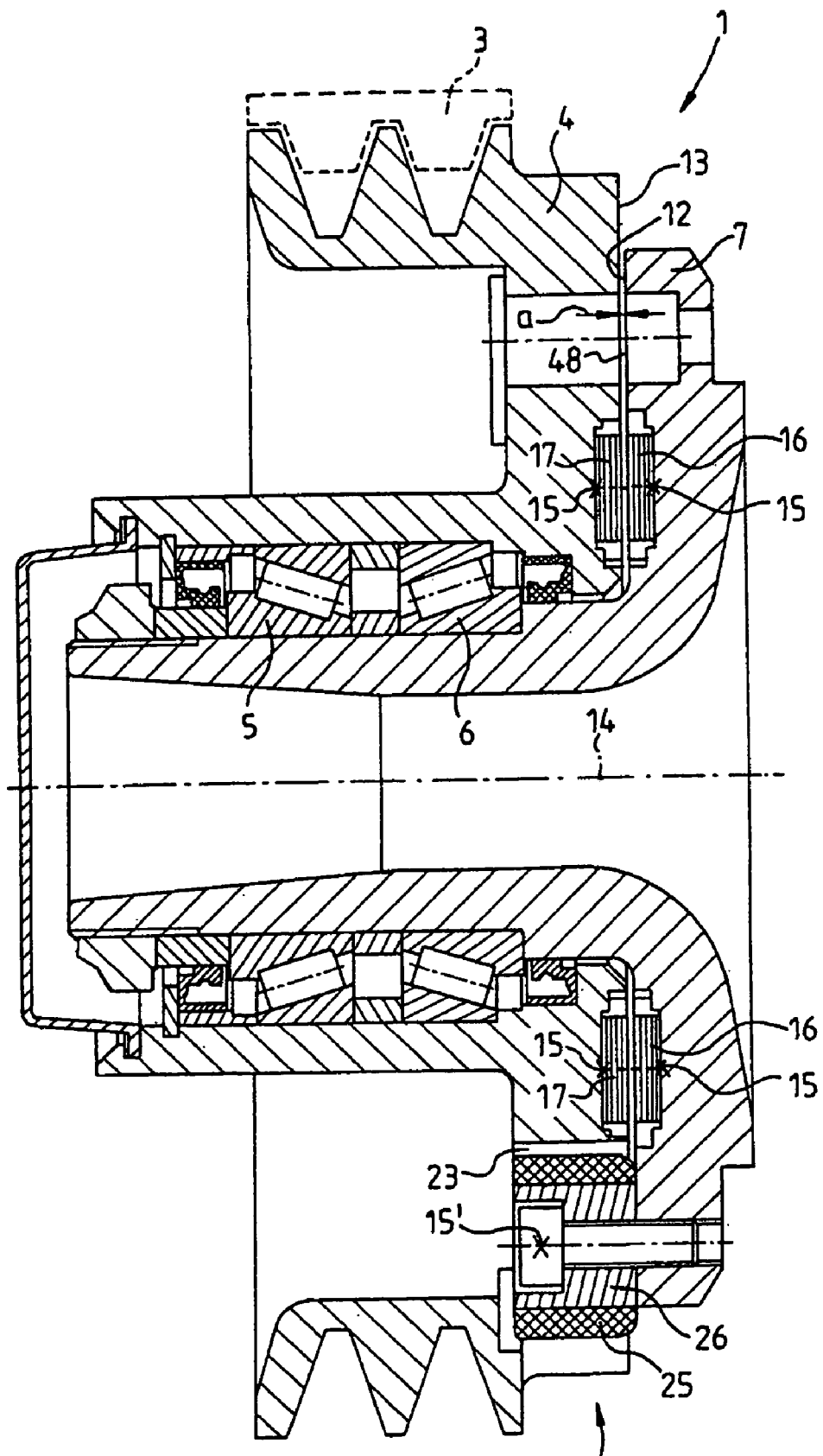
Figure 2:
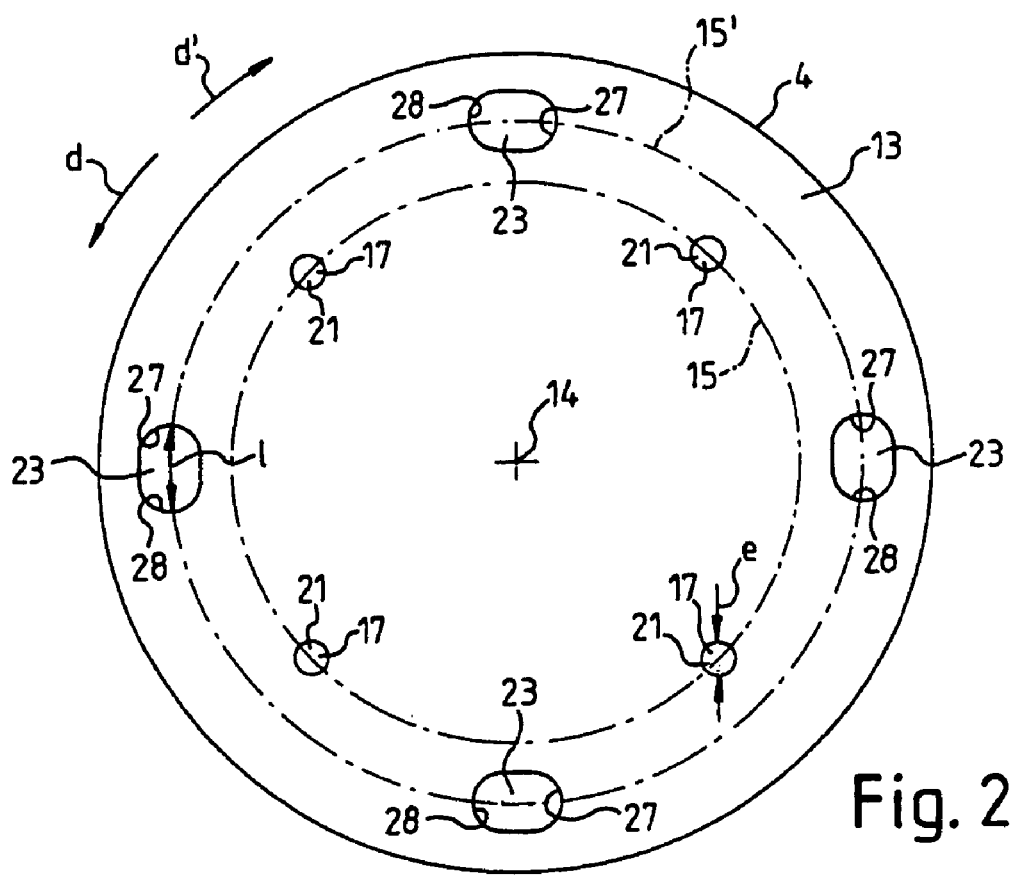
Figure 3:
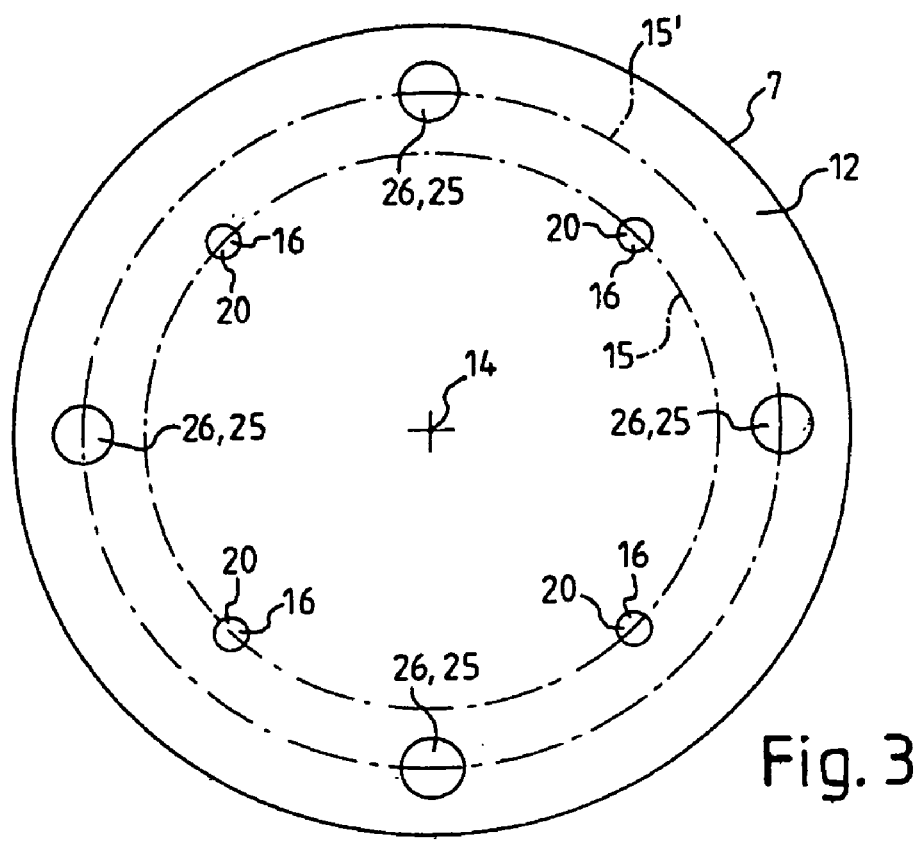
Figure 4:
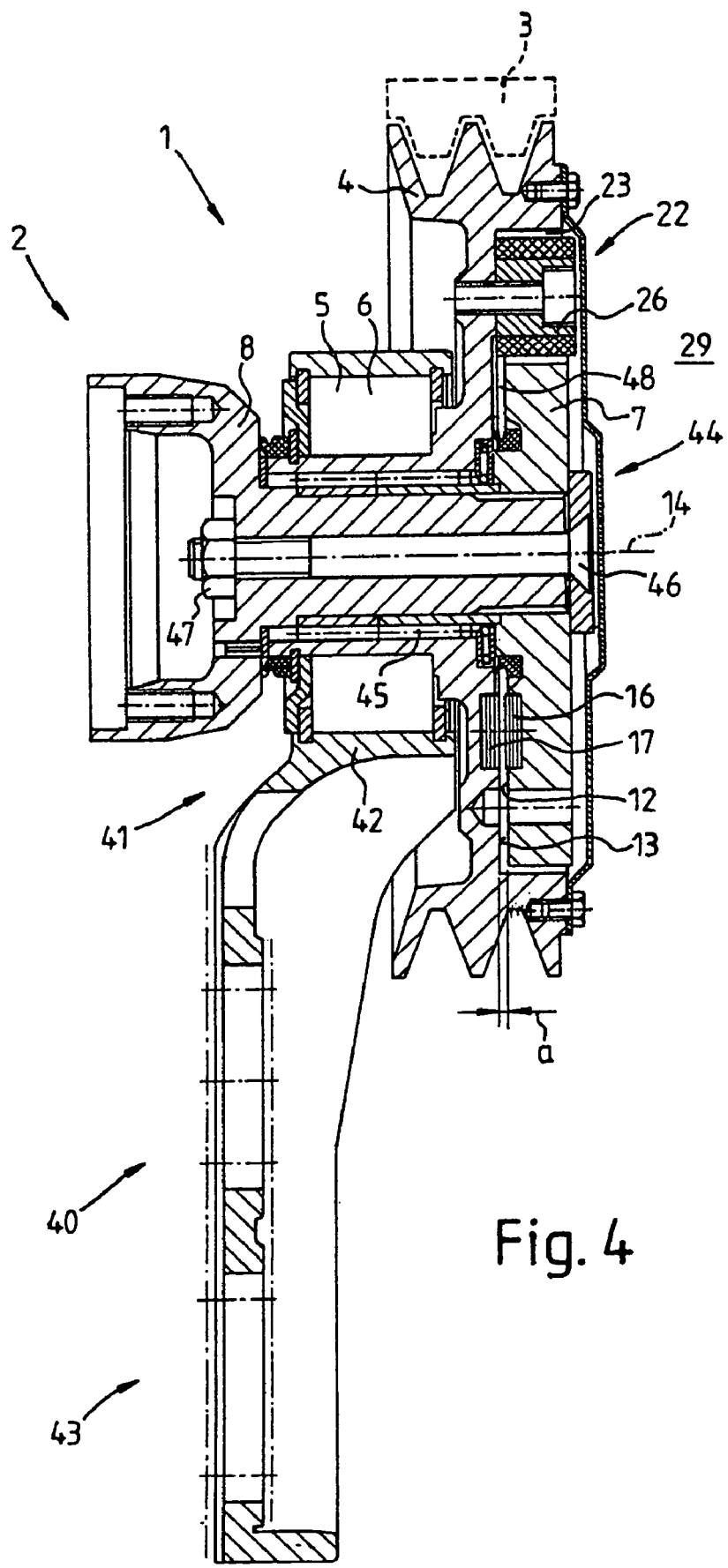
Figure 5A:
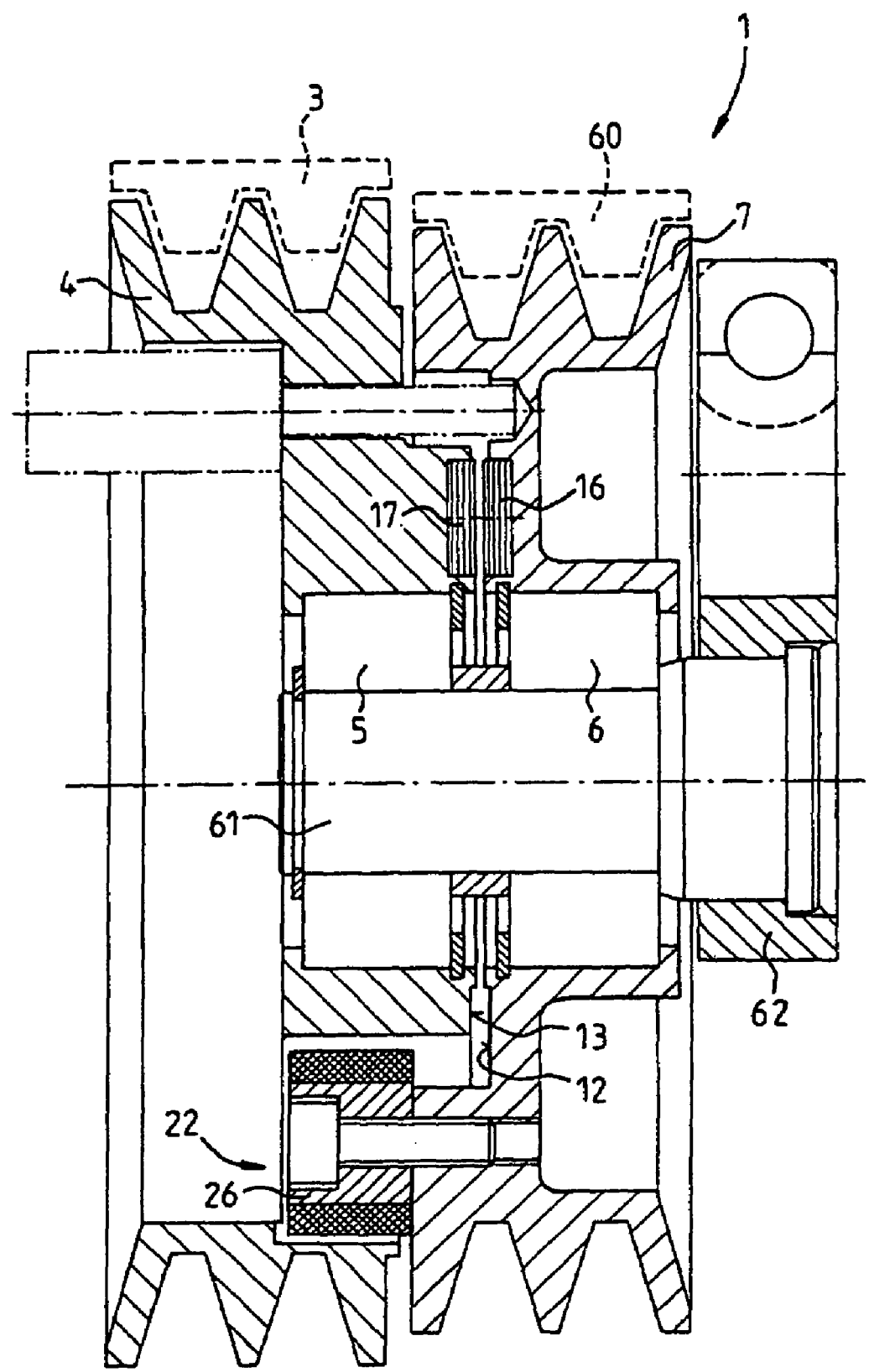
Figure 5B:
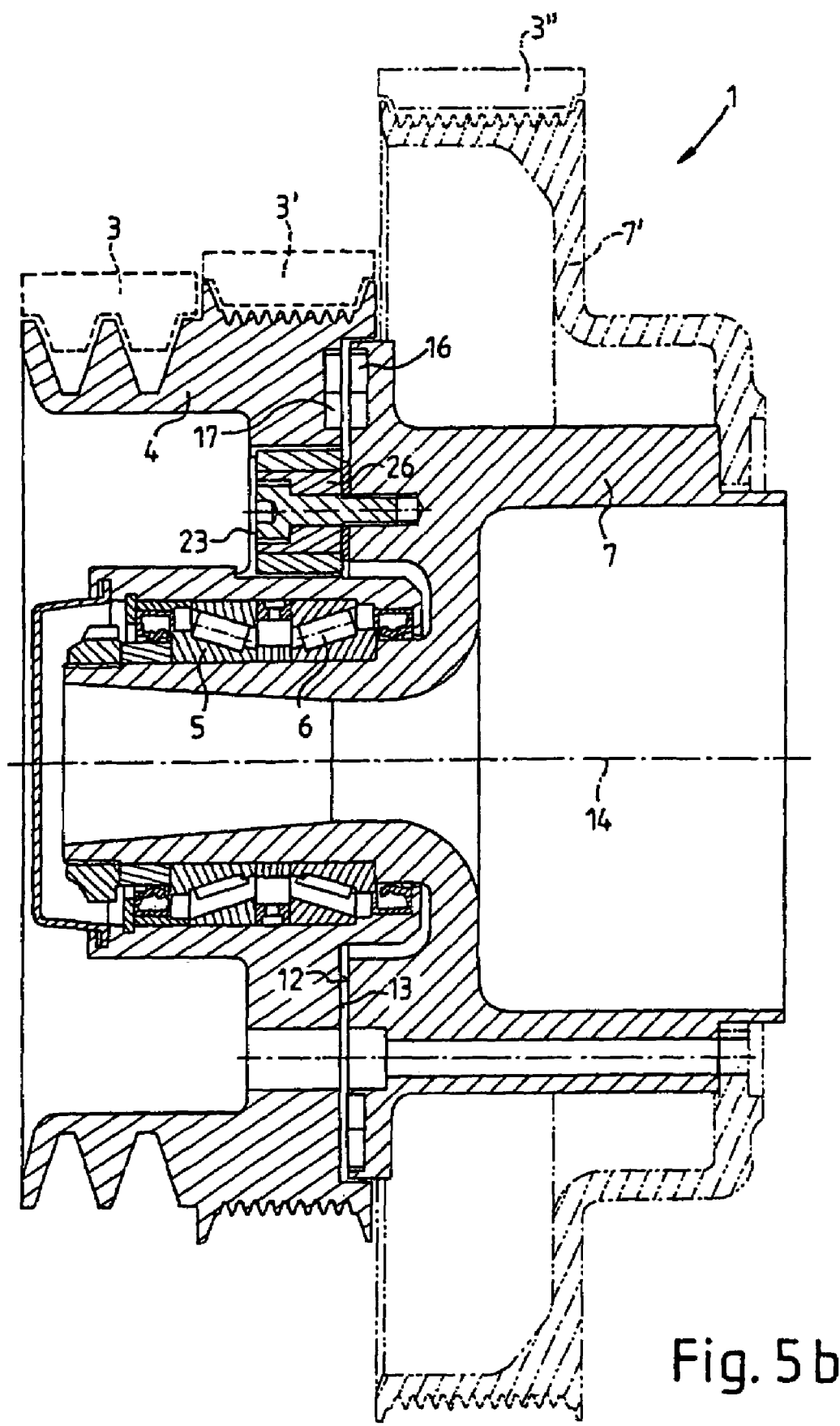
Figure 6:
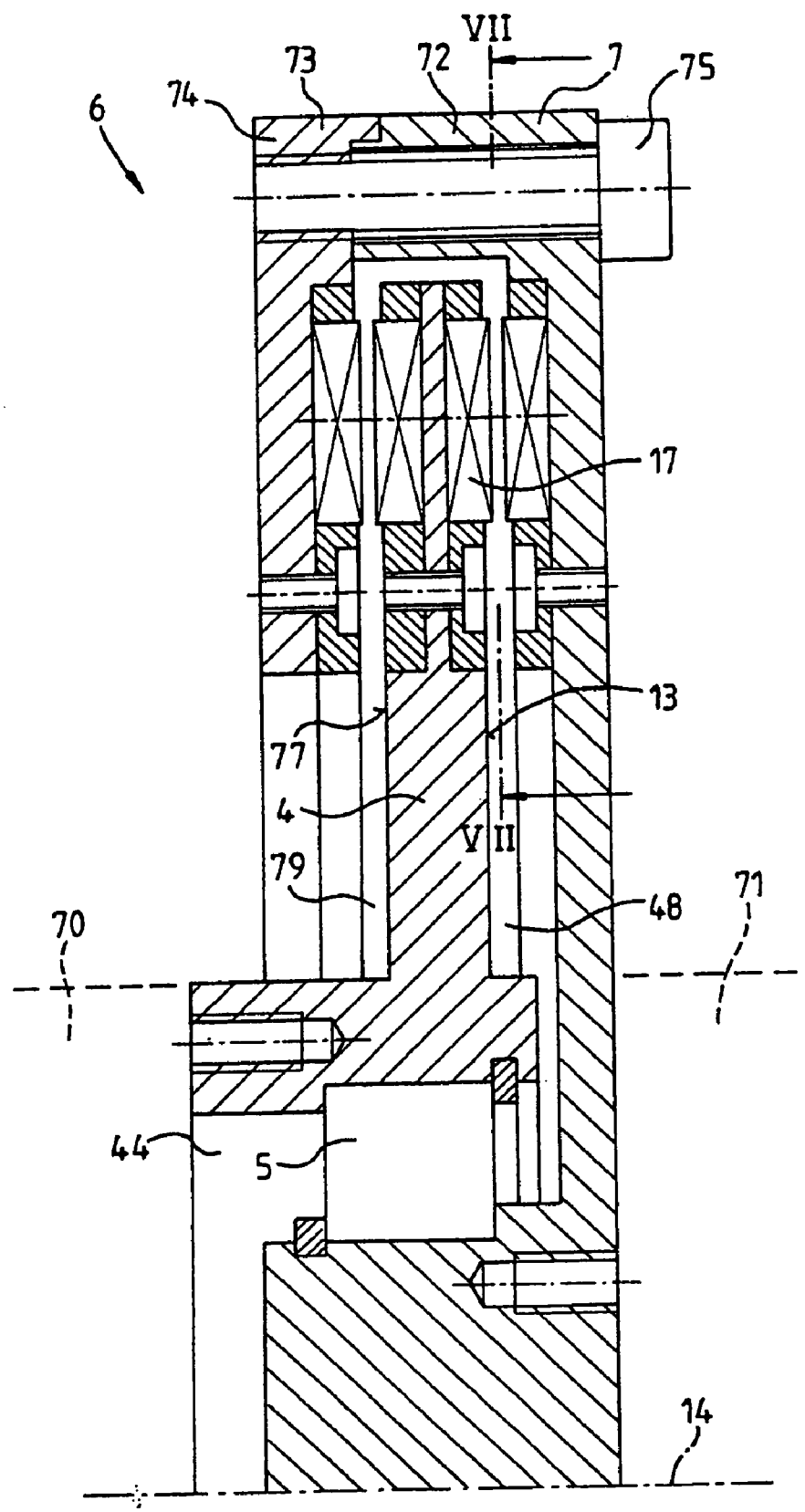
Figure 7:
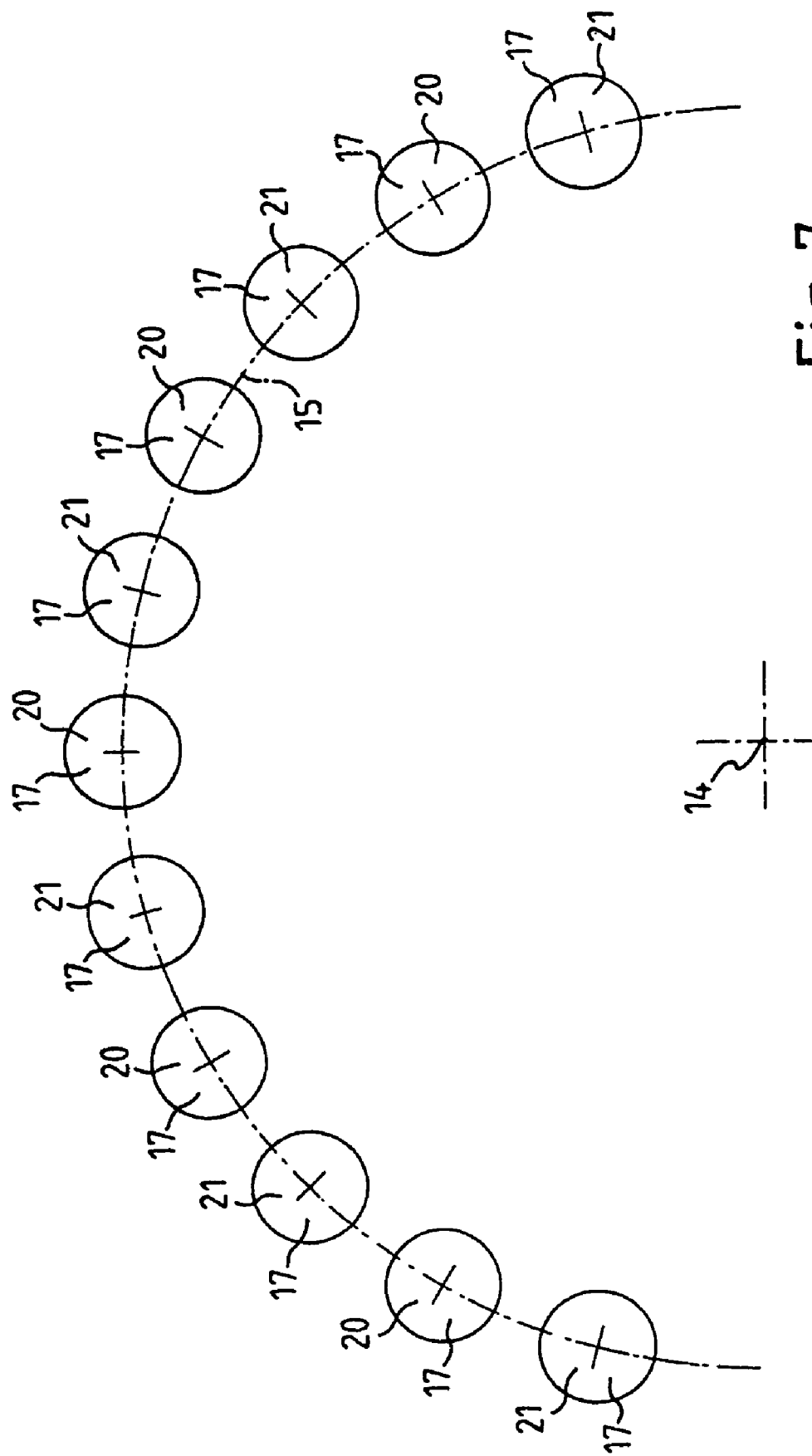
Figure 8:
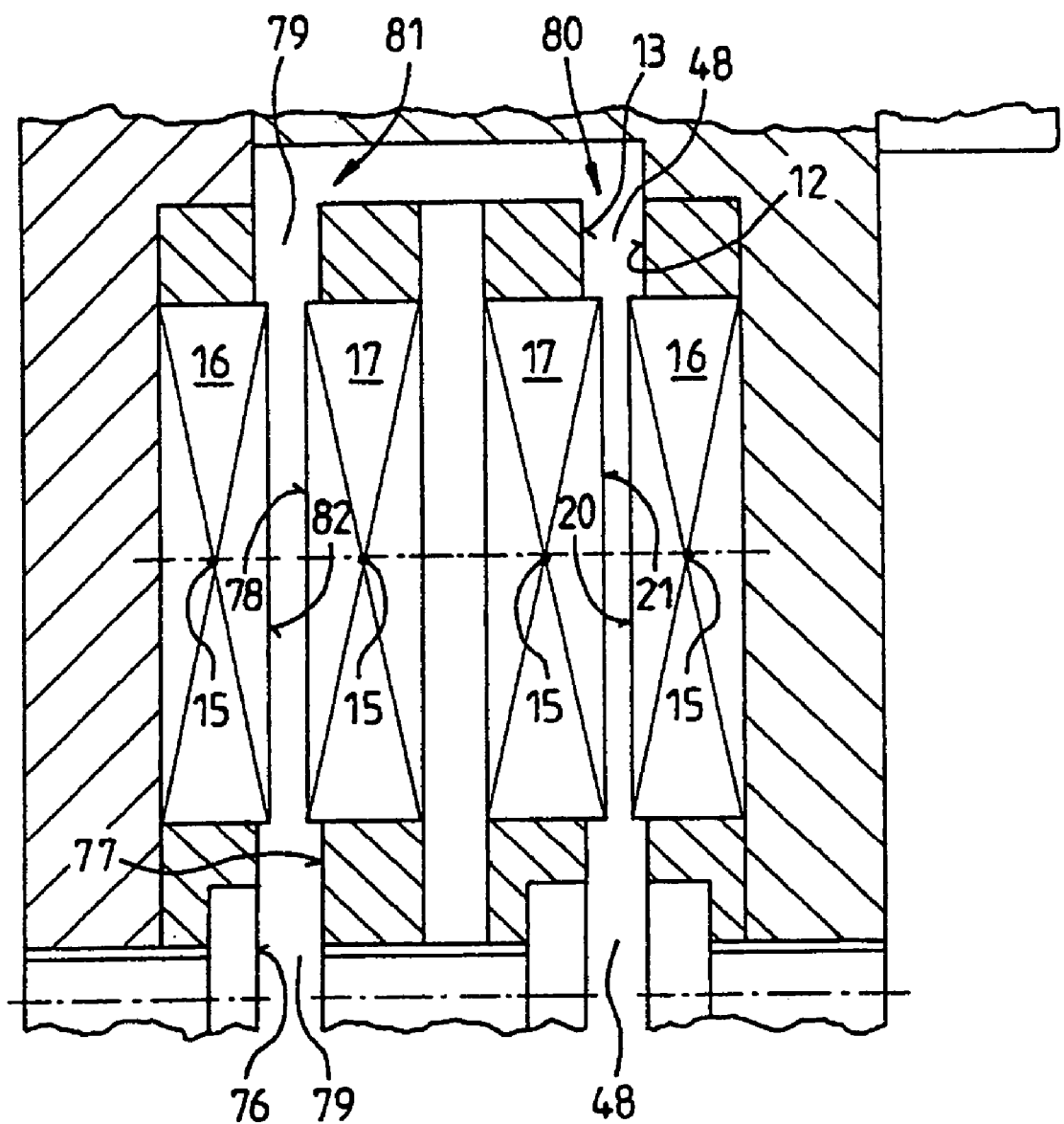
Figure 10:
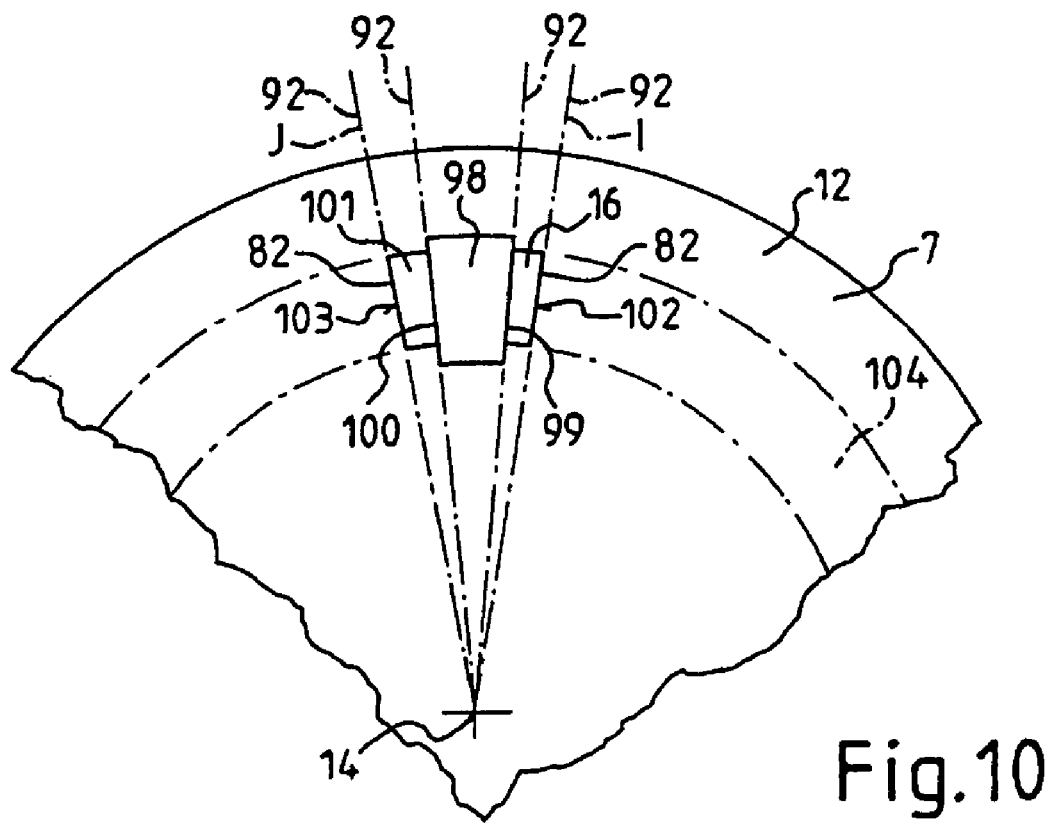
Figure 11:
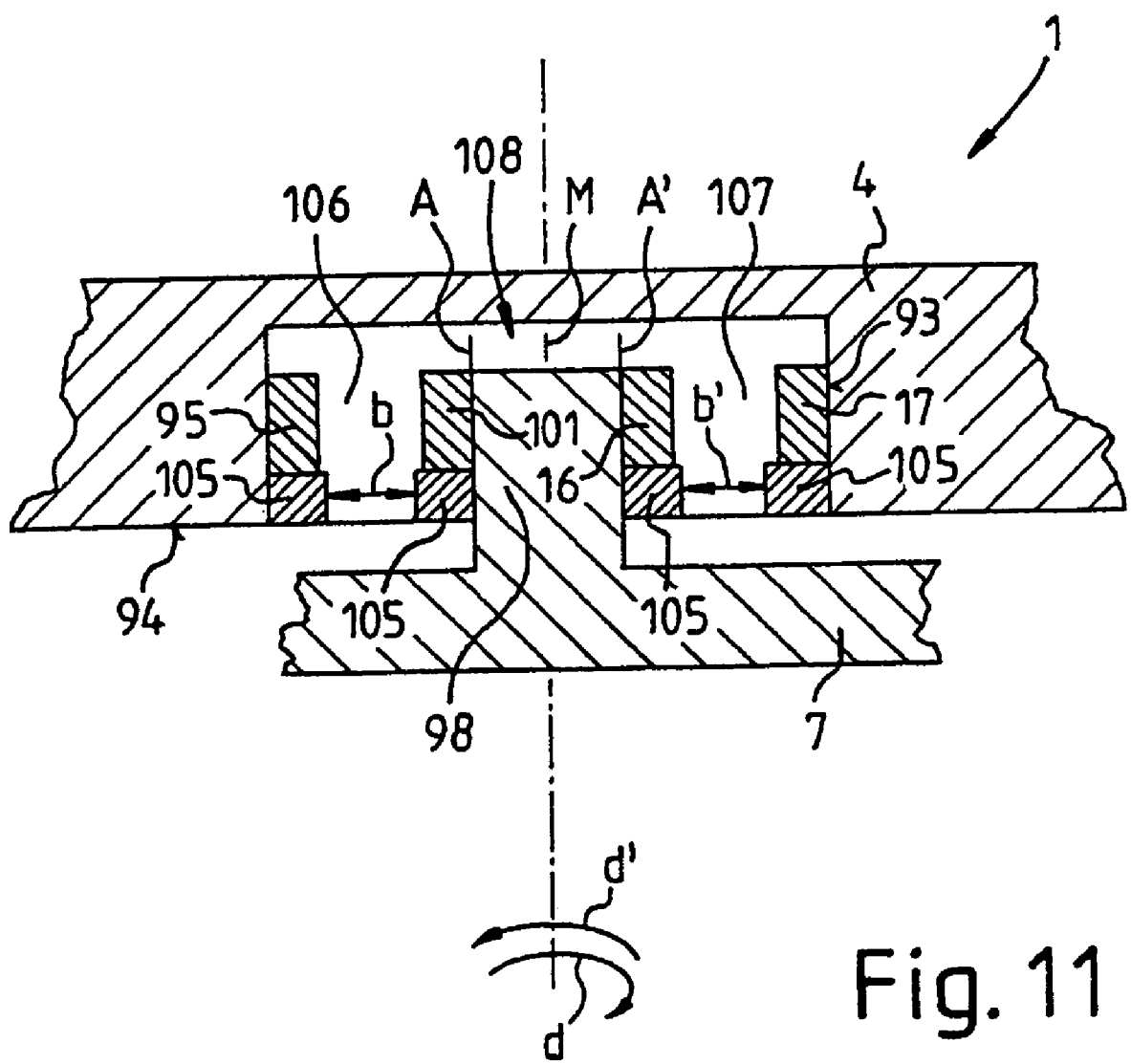
Figure 12:
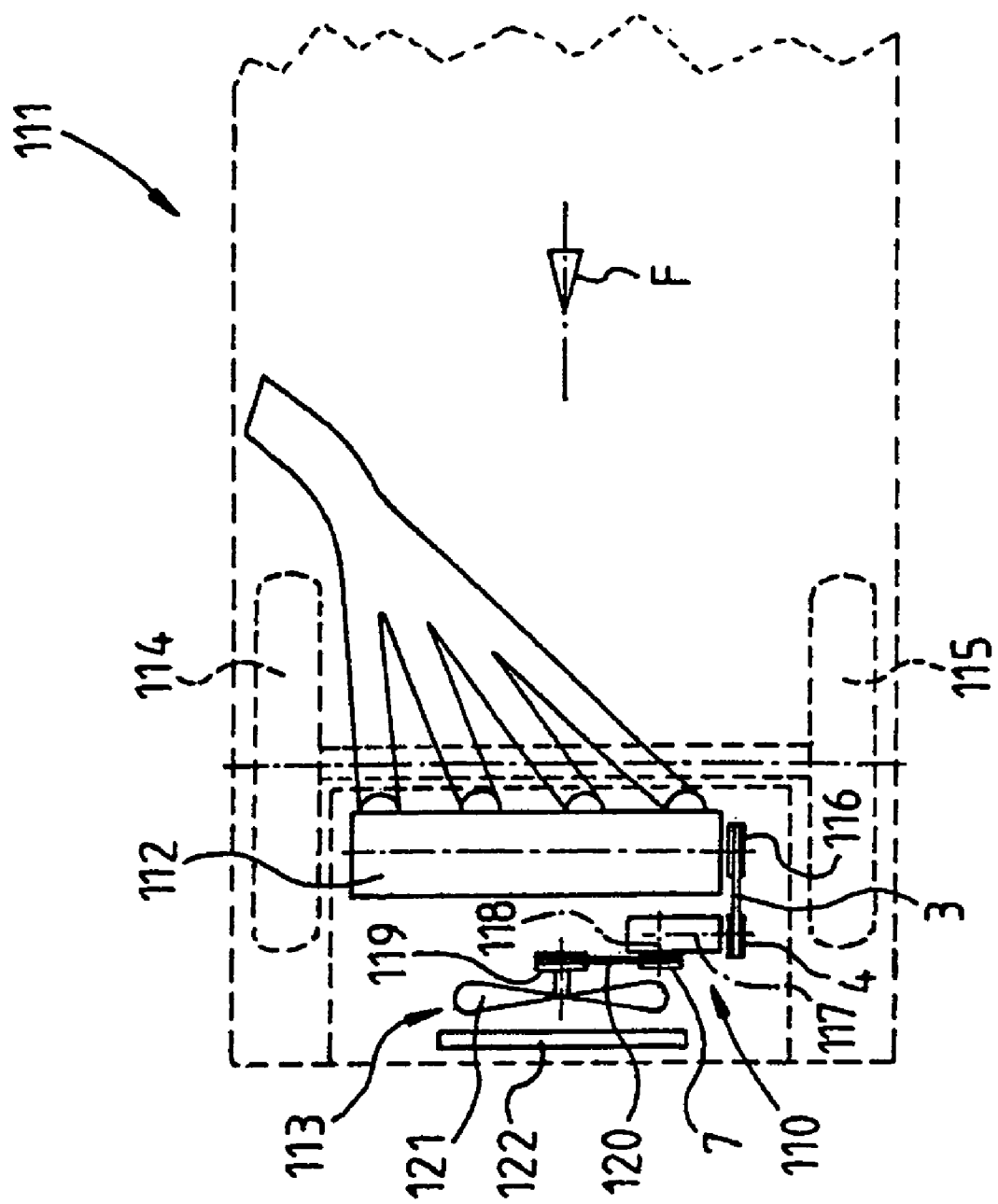
Figure 13:
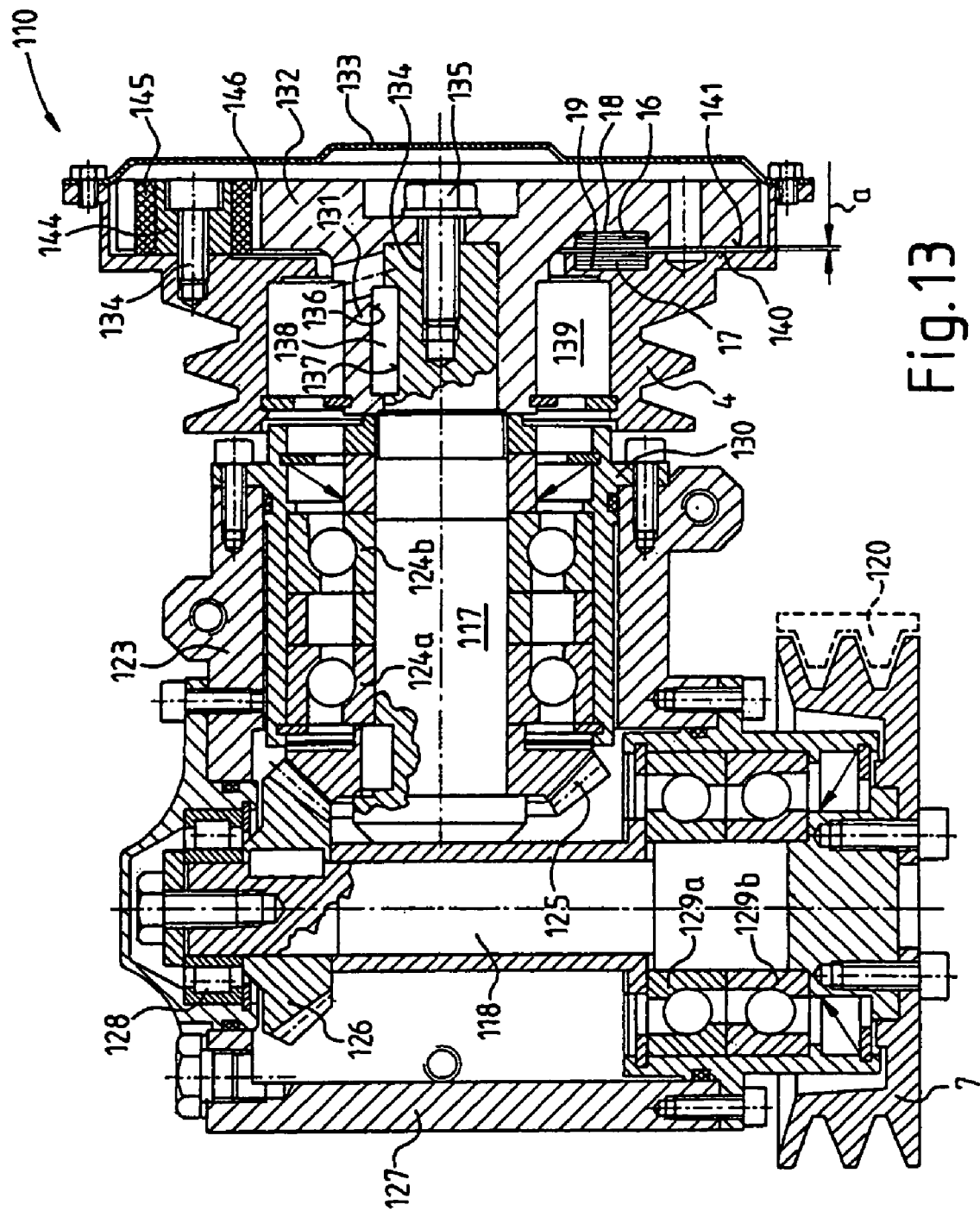

Further details of the invention will be described in the drawing with reference to exemplary embodiments which are illustrated schematically. In the drawing:

FIG. 1*a* shows a sectional view of a device according to the invention,

FIG. 1*b* shows a sectional view of a further device according to the invention, FIG. 2 shows a schematically illustrated plan view of the flange surface 13 of the device illustrated in FIG. 1*a*, FIG. 3 shows a schematically illustrated plan view of the flange surface 12 of the device illustrated in FIG. 1*a*, FIG. 4 shows a sectional view of a third device according to the invention, FIG. 5*a* shows a sectional view of a fourth device according to the invention, FIG. 5*b* shows a side view of a fifth device according to the invention, FIG. 6 shows a sectional view of a fourth device according to the invention, FIG. 7 shows an exemplary illustration for the arrangement of permanent magnets, FIG. 8 shows a view of a detail from FIG. 6, FIGS. 9–11 show a variant embodiment of a device according to the invention, FIG. 12 shows a schematic illustration of an angular gear mechanism arranged in a vehicle, and FIG. 13 shows a sectional illustration of a further angular gear mechanism.

DETAILED DESCRIPTION OF THE INVENTION INCLUDING BEST MODE

FIG. 1*a* illustrates a first embodiment of a device 1 according to the invention. The device 1 is provided for use between a driving machine (not illustrated), such as, for example, an internal combustion engine, and an auxiliary assembly 2 which is to be driven by the driving machine, such as, for example, a compressor for an air conditioning system or an additional electric generator. In the present exemplary embodiment, the device 1 is driven via a belt 3 on a belt pulley 4 of the device 1. The device 1 essentially comprises the belt pulley 4 and an opposite pulley 7 which is mounted rotatably therein via rolling bearings 5, 6. The opposite pulley 7 accommodates, in a rotationally fixed manner, a flange 8 which belongs to the auxiliary assembly 2 and is threaded to a drive shaft 9 (not illustrated) of the auxiliary assembly 2. The rotationally fixed connection between the opposite pulley 7 and the flange 8 takes place by means of a clamping cone 10 which is formed on the flange 8 and is clamped against the opposite pulley 7 by means of a clamping screw 11. The opposite pulley 7 and the belt pulley 4 face each other on flange surfaces 12, 13. The flange surfaces 12, 13 are orientated approximately perpendicular with respect to an axis of rotation 14 of the device 1 and of the flange 8. Furthermore, the flange surfaces 12, 13 are at a distance a from each other. On circular paths 15 (FIG. 1b) running concentrically with the axis of rotation 14, circular permanent magnets 16, 17 are arranged at regular distances on the flange surfaces 12, 13 (also see in this regard FIGS. 2 and 3 which are schematic and idealized). Referring now to FIGS. 1a, 1b, 2 and 3 the permanent magnets 16, 17 sit in circular depressions 18, 19 of the flange surfaces 12, 13. The flange surface 12, 13 are fitted with permanent magnets 16, 17 in such a manner that mutually attractive permanent magnets 16, 17 lie opposite each other in this embodiment. This means that opposite a permanent magnet 16, which is arranged on the flange surface 12 of the opposite pulley 7 and points with a south pole 20 toward the flange surface 13, a permanent magnet 17, which is arranged on the flange surface 13 and points with a north pole 21 toward the flange surface 12 and toward the permanent magnet 16. This arrangement of the permanent magnets 16, 17 on the flange surfaces 12, 13 means that the belt pulley 4 and the opposite pulley 7 are mutually attractive. This has the effect that when the belt pulley 4 is rotated in the arrow direction d about the axis of rotation 14, the opposite pulley 7 is carried along in the arrow direction d, the carry-along effect being caused solely by the magnetic forces acting between the permanent magnets 16, 17. The permanent magnets 16, 17 lie in planes E, F which run parallel to each other and are intersected vertically by the axis of rotation 14. In the exemplary embodiment, the permanent magnets 16, 17 can transmit approximately 50% to 85% of the maximum torque which occurs. If this limiting torque is exceeded, carry-along connections 22 between the pulleys 4, 7 come into use in order to avoid the belt pulley 4 sliding past the opposite pulley 7. The carry-along connections 22 are arranged on further circular paths 15', which run concentrically with the axis of rotation 14, of the flange surfaces 12, 13. The circular path 15' is disposed outside the circular paths 15 on which the permanent magnets 16, 17. Ellipse-like grooves 23 or grooves running along a circular arc are formed on the belt pulley 4 and are arranged point-symmetrically with the axis of rotation 14 and are open toward the flange surface 13. Arranged opposite the grooves in the opposite pulley 7 are threaded holes 24 into which a bolt 26, is encased by an elastic plastic ring 25 and forms a screw and a sleeve that is screwed together. Each carry-along connection 22 is therefore formed by a bolt 26 with an elastic plastic ring 25, which interacts with a groove 23. In the exemplary embodiment, the bolt 26 comprises a screw and a sleeve which is held by the latter. The limited length 1 (FIG. 2) of the grooves 23 prevents the belt pulley 4 from sliding toward the opposite pulley 7. The grooves 23 and the bolts 26 with the elastic plastic rings 25 are dimensioned in such a manner that the belt pulleys 4 can be rotated with respect to the opposite pulley 7 both in the arrow direction d and in the opposite arrow direction d'. If the abovementioned limiting torque is exceeded, the opposite pulley 7 is carried along by interaction of bolts 26 and grooves 23, the grooves 23 then bearing with an end surface 27, 28, (FIG. 2) depending on the direction of rotation, against the elastic plastic rings 25. Vibrations or an alternating driving speed are intercepted by the play present between the pulleys 4, 7 or between the end surfaces 27, 28 of the grooves 23 and the elastic plastic ring 25 of the bolt 26 in the directions of rotation d, d'. These vibrations or alternating driving speed is not directly transmitted to the auxiliary assembly 2 or if transmitted is transmitted only in a damped manner. This damping is assisted by the magnetic forces acting between the magnets 16, 17 and is low-wearing. The device 1 is covered toward a side 29 which faces away from the auxiliary assembly by a cover 30. The length 1 of the grooves 23 is designed in relation to a diameter of the bolt 26 in such a manner that the play which exists in the directions of rotation d, d' is smaller than a half diameter e of the permanent magnets 16, 17, which are circular in plan view.

Further generally regarding FIG. 1a: the torque is transmitted by a belt drive between an output shaft of the internal combustion engine and the shaft of a first auxiliary assembly. A component 7 which rotates without contact and carries permanent magnets is disposed between a driven belt pulley 4 and the shaft of the auxiliary assembly 2. This component 7 which carries permanent magnets 16 can additionally be provided with transmission bolts 26 which take on the transmission function if the torque which is to be transmitted exceeds the magnetic forces. The belt pulley 4 has a first flange 4, 13 which is directed toward the auxiliary assembly 2. Said flange is occupied with a multiplicity of permanent magnets 17 in a circular arrangement. The permanent magnets 17 are fitted in pairs in an alternating north and south pole arrangement and in such a size and/or number that they can transmit between 50% and 85% of the maximum torque to be transmitted. The first flange 4, 13 have coaxial, circularly curved annular grooves 23 which are preferably placed outside the permanent magnets 17. The belt pulley 4 has an inner hole for receiving at least one bearing 5, 6. The latter is secured against axial displacement by a stop surface and a snap ring. In their inside diameter, the bearings 5, 6 receive an elongate hub of a second flange 7, 12. This second flange 7, 12 lies parallel to the first flange, but at an axial distance therefrom. On its surface 12 which faces the first flange 4, 13, the second flange 7, 12 likewise bears permanent magnets 16 in the same circular arrangement, size and number and on the same central diameter of the first flange 4, 13. The two flange surfaces 12, 13 lie opposite each other here in such a manner that a north pole always lies opposite a south pole. The second flange 7, 12 bears stud bolts 26 on a diameter which corresponds to the central diameter of the coaxial, circularly curved annular grooves 23 of the first flange 4, 13. The stud bolts 26 engage in the coaxial, circularly curved annular grooves 23 of the first flange 4, 13 in such a manner that they lie approximately in the center of the circular segment of the annular grooves 23 as long as the torque can be transmitted via the permanent magnets 16, 17. Only if the transmitted torque exceeds the magnetic forces are the two flanges 7, 12 or 4, 13 twisted with respect to each other in such a manner that the stud bolts 26 come to bear against a side end 27, 28 of the annular grooves 23 and take on the transmission of torque until the transmitted torque has dropped again to at least match the retention forces of the permanent magnets 16, 17. The hub of the second flange 7, 12 is fastened in a rotationally fixed and axially secured manner on the free shaft end 8 of the auxiliary assembly 2 (not shown in its entirety). The transmission of the torque is therefore ensured. The power which is required in each case, and therefore the torque which is to be transmitted by the auxiliary assembly 2 is set by a separate control device.

According to one variant which is not further illustrated in the drawing, the air gap a between the opposite rows of permanent magnets can preferably be set mechanically before the unit is installed. Since the magnetic forces in the zero position of opposite north and south poles are relatively small, torsional vibrations which occur can be damped without noise and effectively by the fact that the two flanges swing slightly with respect to each other by an amount around the zero position of the magnetic field. The transmission of the torque is ensured, since in the event of a relatively severe deviation from the zero position when the magnetic field lines are more severely distorted, their magnetic force changes in a progressively rising manner.

It is of further advantage to provide an adjustable distance between the two flange surfaces. Now, given the same overall size of the unit bearing the permanent magnets, the torques which are to be transmitted and/or the magnitude of the damping effect of the torsional vibrations can be adapted to different requirements for different motor vehicles. As a result, a great variety of types is avoided.

It is likewise of advantage to provide an elastic casing for the stud bolts which are fastened in the second flange. Even at high torques, said casing takes on a certain damping of torsional vibrations in comparison to the otherwise "metallically" bearing, non-damping stud bolts.

FIG. 1b a second variant embodiment of a device 1 is illustrated according to the invention. The device 1 essentially comprises a belt pulley 4 which is driven by a belt 3 and is mounted via roller bearings 5, 6 on an opposite pulley 7, which is T-shaped in cross-section. The opposite pulley 7 is designed for the attachment to an auxiliary assembly (not illustrated). The pulleys 4, 7 lie opposite each other with flange surfaces 13, 12. On the flange surfaces 12, 13, permanent magnets 17, 16 are arranged on circular paths 15 running concentrically with an axis of rotation 14 of the device 1. The permanent magnets 17, 16 lie opposite each other separated by a gap 48 of width a. When the belt pulley 4 is rotated, the magnetic forces acting between the permanent magnets 17, 16 cause the opposite pulley 7 to be towed along. Carry along connections 22 are utilized upon the generation of torques which can no longer be accommodated between the belt pulley 4 and the opposite pulley 7 solely by the permanent magnets 16, 17. The carry-along connections 22 are arranged on a further circular path 15' which runs concentrically to the axis of rotation 14 and has a larger diameter than the circular path 15. The carry-along connections 22 of which only one is seen in the section illustrated in FIG. 1b, essentially comprise grooves 23 running along the circular path 15' and a bolt 26 which is encased by an elastic plastic ring 25. In an extreme loading situation, the opposite pulley 7 is then towed along by the belt pulley 4 via the bolts 26 which are connected to the opposite pulley. With regard to the basic arrangement of the permanent magnets 16, 17 and of the grooves 23 and the bolts 26, reference is made to the illustrations in FIGS. 2 and 3.

FIG. 4 shows a third variant embodiment of a device 1 according to the invention. In contrast to the device illustrated in FIG. 1, the device 1 which is illustrated in FIG. 4 is not fitted on an auxiliary assembly 2, but rather is mounted together with the latter on a support 40. Support 40 has at one end 41 as an annular hub 42 and is provided at a second end 43 for fastening to a vehicle frame or an engine block (not illustrated). A belt pulley 4 is mounted in the hub 42 by means of ball bearings 5, 6 which can be driven by an engine (not illustrated) via a belt 3. Concentrically to an axis of rotation 14 of the device 1, the belt pulley 4 has a hole 44 in which a flange 8 belonging to the auxiliary assembly 2 is disposed in a freely rotatable manner via a further bearing 45. The belt pulley 4 and the flange 8 are therefore mounted in the hub 42 of the support 40 in a manner such that they can be rotated freely with respect to each other and can be rotated freely with respect to the hub 42. On a side 29 of the device 1 that lies opposite the auxiliary assembly 2, the flange 8 is connected in a rotationally fixed manner to an opposite pulley 7. The connection of the opposite pulley 7 to the flange 8 is realized by a clamping screw 46 which interacts with a jam nut 47 and pulls the opposite pulley 7 onto the flange 8. This rotationally fixed connection between the flange 8 and the opposite pulley 7 means that the opposite pulley 7 is provided with the same freedom of movement with respect to the hub 42 and the belt pulley 4, this freedom being limited by carry-along connections 22 which act between the belt pulley 4 and the opposite pulley 7. In a similar manner to the device described in FIG. 1, the opposite pulley 7 and the belt pulley 4 carry, on opposite flange surfaces 12, 13, permanent magnets 16, 17 which lie opposite each other in pairs. The flange surfaces 12, 13 are at a distance a from each other by an air gap 48 disposed between them. The permanent magnets 16, 17, which lie opposite each other in pairs, lie opposite each other with different polarities and attract each other. The magnetic forces counteract a displacement of the permanent magnets 16, 17 with respect to each other, i.e. twisting of the belt pulley 4 with respect to the opposite pulley 7, said magnetic forces endeavoring to keep the magnets 16, 17 exactly in a position in which they are aligned with each other. To avoid the belt pulley 4 from sliding with respect to the opposite pulley 7 at peak torques and in order also to be able to permanently transmit high torques, grooves 23 interact with bolts 26 (also see the description for FIG. 1a) are again used as the carry-along connections 22. The carry-along connections 22 and the permanent magnets 16, 17 are arranged on circles (not illustrated) running concentrically with the axis of rotation 14 on the flange surfaces 12, 13. In this case, the carry-along connections 22 and the permanent magnets are not arranged in congruent positions so that they do not physically obstruct one another. In contrast to FIG. 1a, in the device 1 described in FIG. 4, the bolts 26 are arranged on the belt pulley 4 and the grooves 23 are arranged on the opposite pulley 7.

According to one variant embodiment provision is made to provide the magnets in congruent positions with the carry-along connections in order to fully utilize the available structural space. In a device of this type, the permanent magnets are then arranged on the bottom of the grooves and on the head of the bolts. More particularly the grooves are not to be designed in this case as openings, but rather only as depressions.

Further generally regarding FIG. 4: the use of a support 40 which can be fastened on a body part permits the entire unit 1 to be mounted rotatably in it. One support limb preferably merges into a hub 42. Through this hub 42 there extends, firstly, the free shaft end 8 of the auxiliary assembly 2 (not illustrated specifically) and, secondly, a hub of the belt pulley 4. In this case, the hub of the belt pulley 4 is mounted rotatably on the free shaft end 8 of the auxiliary assembly 2 via at least one bearing 5, 6. The belt pulley 4 and the free shaft end 8 are secured against axial displacement in the hub 42 of the support 40—the free shaft end 8 by means of an axial screw connection 46, 47 and the belt pulley 4 by means of a bearing surface and a snap ring. In a manner which has already been described, surface 13 of the belt pulley 4 which faces away from the auxiliary assembly 2 carries permanent magnets 17 with alternating polarity on a circular ring. The axial screw connection 46, 47 of the free shaft end 8 of the auxiliary assembly 2 is used at the same time to clamp a flange 7 against the surface 13 of the belt pulley 4 and at a distance a from the latter. This flange 7 likewise carries permanent magnets 16 alternating with opposite poles in a circular arrangement. Said permanent magnets lie with opposite poles opposite those of the belt pulley 4. The belt pulley 4, 13 or the flange 7, 12 can bear stud bolts 26, preferably in a circle lying outside the permanent magnets 16, 17. The respective counterpart has axially arranged, circularly curved annular grooves 23 in which the stud bolts 26 engage.

A further advantageous refinement is produced when a large radial gap of certain axial depth is provided between the inside diameter of the hub of the support and the outside diameter of the hub of the belt pulley.

A device for controlling the auxiliary device, for example a coupling, can be inserted into this gap.

FIG. 5a shows a fourth variant embodiment of a device 1 according to the invention. The device 1 comprises a belt pulley 4 which is driven by a belt 3, and a driving belt pulley 7. The driving belt pulley 7 drives an auxiliary assembly (not illustrated) by a second belt 60. The pulleys 7, 4 are mounted rotatably by ball bearings 5, 6 on an axle stub 61 which is fastened, for example, to an engine block or a vehicle frame by a flange 62. Between the pulleys 7, 4, permanent magnets 16, 17 and driver connections 22 are arranged on flange surfaces 12, 13 in a manner disclosed in FIGS. 1 to 4.

Further generally regarding FIG. 5a: in the structural embodiment of the device 1 according to FIG. 5a, two belt pulleys 4, 7 are mounted rotatably on a common axle 61. One of the two belt pulleys 4, 7 is the one driven by the internal combustion engine, the other is a belt pulley driving the auxiliary assembly via a belt drive. The driving belt pulley 4 may also be additionally connected directly to the shaft of a further auxiliary assembly. The axle 61 on which the two belt pulleys 4, 7 are mounted can be mounted in a support. The two belt pulleys 4, 7 and, if appropriate, an auxiliary assembly are carried on this support, which is fastened to the internal combustion engine or a body part, while a second auxiliary assembly (not illustrated) is fastened to another component. The two opposite surfaces 12, 13 of the two belt pulleys 4, 7 carry permanent magnets 16, 17 in a manner which has already been described. The magnetic force of said permanent magnets causes the transmission of torque and the damping of torsional vibrations from the driven to the driving belt pulley which possibly includes an additional auxiliary assembly. Also in this embodiment, the magnetic forces can be dimensioned in such a manner that only a partial torque is transmitted and the complete torque is transmitted via stud bolts 26, as already described.

If the inventive concepts of FIG. 1 and FIG. 5a are combined, it is also possible to design the outside diameter of the flange according to FIG. 1 as a belt pulley. This produces, given a different structural design, and an embodiment of the invention similar to FIG. 5a.

A combination of the inventive embodiments according to FIG. 4 and FIG. 5a is also expediently possible if the outside diameter of the flange according to FIG. 4 is designed as a belt pulley in such a manner that it is extended outward on its free, outer end side and merges there into a larger diameter belt pulley.

FIG. 5b illustrates a fifth variant embodiment of a device 1 according to the invention. This embodiment again essentially comprises a belt pulley 4 which is mounted via rolling bearings 5, 6 on an extension of a pulley 7. The pulleys 4, 7 lie opposite each other with flange surfaces 12, 13. Permanent magnets 16, 17 which lie opposite each other in pairs are arranged on these flange surfaces 12, 13. Furthermore, there are driver connections 22 between the pulleys 4, 7, said connections being formed by groove-shaped recesses 23 in the pulley 4 and with bolts 26 connected to the pulley 7. The pulley 4 is provided for the attachment of two belts 3, 3'. The pulley 7 is assigned a belt pulley 7' in a rotationally fixed manner by which a further belt 3" can be attached. Furthermore, a conical flange of a driving or auxiliary assembly (not illustrated) can be attached to the pulley 7. The device 1 which is illustrated in FIG. 5b can be used in very different ways. It is provided, for example, to attach the pulley 7 to a driving assembly (not illustrated) and to transmit the rotation thereof in a vibrationally damped manner to the pulley 4 and on via the belts 3, 3' to auxiliary assemblies. In addition, in an operation of this type, there is the possibility of passing driving power on directly from the driving assembly via the belt 3". Furthermore, provision is made, for example, to flange the pulley 7 onto an auxiliary assembly (not illustrated). The drive then takes place, for example, via the belt 3, in which case the driving power supplied by belt 3 is supplied to the auxiliary assembly in a vibrationally damped manner by the interconnection of the pulleys 4, 7. The belt 3' furthermore running on the pulley 4 is used to drive, for example, a further auxiliary assembly which is unsusceptible to vibrations. For example the vibrationally damped torsional energy can be transmitted by the belt 3" to a third auxiliary assembly. Finally, an operation of the device 1 is also provided by way of example, in which the pulley 7 is mounted rotatably on an axle (not illustrated) and the pulley 7 is driven via the belt 3"'. Damping of the vibrations then takes place between the pulley 7, which is connected in a rotationally fixed manner to the belt pulley 7', and the pulley 4 resulting in the transmission of torsional energy introduced by the belt 3"' to the belts 3 and 3' in a vibrationally damped manner.

FIG. 6 illustrates a further variant embodiment of an arrangement 1 according to the invention. In particular, this embodiment provides for the transmission of torque and damping of torsional vibrations at high torques. An embodiment of this type is suitable, for example, for motor vehicles, boats and aircraft, in which the arrangement is used between an engine output and a transmission input or between a transmission output and a wheel or propeller drive. It is precisely in torsional connections of this type that it is necessary to be able to transmit the maximum torque if the damping of the torsional vibrations is active, since, as is known, the maximum torque has to be transmitted here in the partial-load range of the internal combustion engine. The structural embodiment is illustrated in FIG. 6 provides for a flange of a pulley 4 connected onto an engine output shaft 70 or onto the transmission output shaft 70 (indicated by dashed lines). In a hole 44 in the pulley 4 is centered with respect to an axis of rotation 14 of the arrangement 1, a further two-part pulley 7 is mounted via a bearing 5. The pulley 7 is flanged onto an input shaft 71 (indicated by dashed lines) of a transmission (not illustrated specifically). The two-part pulley 7 essentially comprises two C-shaped partial pulleys 72, 73 which are fastened to each other in a circular edge region 74 by means of screws 75 distributed uniformly on the circumference. In this case, the partial pulley 73, which is of annular design, is carried by the partial pulley 72. This means the pulley 7 is mounted only in the region of the partial pulley 72. The pulley 4 has two opposite flange surfaces 13, 77 on which permanent magnets 17 are arranged at regular distances on circular paths 15 (see FIGS. 7 and 8). FIG. 7 illustrates a detail of a simplified, idealized sectional view VII—VII of the flange surface 13 of the pulley 4 and of magnets 17 arranged on the latter concentrically with the axis of rotation 14. The permanent magnets 17 point out of the plane of projection in an alternating sequence with north poles 21 and south poles 20. Permanent magnets 16 lie opposite the permanent magnets 17, spaced apart by air gaps 48, 79 (see the detail from FIG. 6 in FIG. 8), and are arranged on flange surfaces 12, 76 of the pulley 7 or of the partial pulley 72, 73. The permanent magnets 16, 17 which are arranged on the opposite flange surfaces 12, 13 or 76, 77 form damping units 80, 81. The damping units support each other or accumulate in their effect. The permanent magnets 16, 17 on the pulleys 4, 7 lie opposite each other in each case with opposite poles, i.e. a south pole 20 of one of the permanent magnets 16 lies opposite a north pole 21 of one of the permanent magnets 17, and a north pole 82 of one of the permanent magnets 16 lies opposite a south pole 78 of one of the permanent magnets 17. The opposite permanent magnets are always separated by air gaps 48, 79. Of course, drivers having play may be arranged in a region (not illustrated) of the arrangement 1 between the pulleys 4, 7 and, if the maximum torque transmitted by the damping units 80, 81 is exceeded, cause the pulleys 7 to be carried along in an interlocking manner by the driving pulley 4. One particular variant embodiment makes provision, for example, for 98% of the maximum torque to be transmitted by means of the magnets.

Further generally regarding FIGS. 6 to 8: in a further refinement of the embodiment illustrated in FIG. 6, a plurality of flanges or pulleys which are mounted one inside another and are supplied with permanent magnets. This enables significantly higher torques to be transmitted with the same flange diameters or pulley diameters or enables the same torques to be transmitted with a smaller, space-saving diameters. If the hub which forms the flange toward the engine output shaft is extended, then a further flange (not illustrated in FIG. 6) which is parallel to the flange at an axial distance from flange 6 can be fastened on said hub in such a manner that the further flange firstly enables the flange to be fitted, but at the same time permits the addition of a flange (likewise not shown) 6. If permanent magnets are now likewise fitted on the opposite flange surfaces of the two flanges, then the increase in the transmission of torque is produced without restricting or noticeably restricting the damping of torsional vibrations. A combination of the structural embodiment according to FIG. 6 and according to FIG. 1*a* results in the further design option of forming the outside diameter of the housing or of the flange as a belt pulley. This allows in addition to the previously described direct transmission or torque and damping of torsional vibrations, an additional transmission and damping for an auxiliary assembly.

Figure 9:
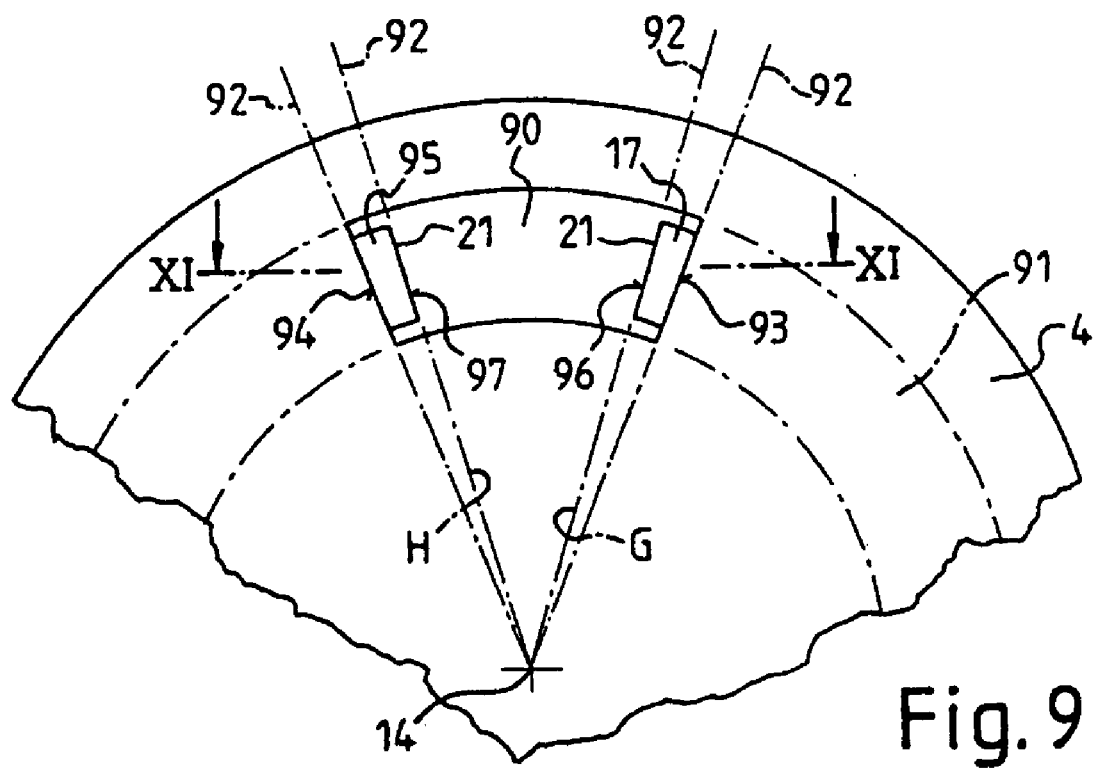

A further variant embodiment of the device 1 according to the invention is illustrated in FIGS. 9 to 11. In FIG. 9 schematically illustrated side view of a belt pulley 4 of the device 1 is shown in section in FIG. 11. The belt pulley 4 has an opening 90, illustrated by way of example, curved concentrically with respect to an axis of rotation 14 and is largely defined by a section of a circular ring 91 (indicated by chain-dotted lines) which lies concentrically with respect to the axis of rotation 14. Permanent magnets 17, 95 which are oriented at each other with north poles 21 are arranged on side surfaces 93, 94 of the opening 90, said surfaces running in the direction of radials 92 (illustrated by chain-dotted lines). Active surfaces 96, 97 of the permanent magnets 17, 95 are likewise oriented parallel to radials 92 (illustrated by chain-dotted lines). The permanent magnets 17, 95 are therefore situated in planes G, H in which the axis of rotation 14 or the particular radial 92 runs. Further openings (not illustrated) are provided in the belt pulley 4 and lie at regular distances on the circular ring.

FIG. 10 shows a pulley 7 which is flanged onto a shaft of an auxiliary assembly (not illustrated) rotated about the axis of rotation 14. By way of example pulley 7 is likewise illustrated schematically and has a lug 98 which protrudes over a flange surface 12 of the pulley 7. The lug 98 bears permanent magnets 16, 101 on side surfaces 99, 100 oriented parallel to radials 92 (illustrated by chain-dotted lines). The permanent magnets 16, 101 have active surfaces 102, 103 which are likewise oriented parallel to radials 92. The permanent magnets 16, 101 are oriented with respect to said active surfaces with north poles 82. The permanent magnets 16, 101 therefore lie in planes I, J to the axis of rotation 14 or the particular radial 92. In the assembled state of the arrangement 1 and of the pulleys 4, 7, the lug 98 of the pulley 7 is disposed in the opening 90 of the pulley 4. The permanent magnet 16, 17 or 101, 95 then face one another. In this embodiment the circular-disk-shaped permanent magnets 16, 17, 95, 101 are oriented in the form of disks in a torus 104 (indicated by chain-dotted lines). An arrangement of lugs 98 provided on pulley 7 correspond to the number and the position of the openings 90 which are arranged on the belt pulley 4.

FIG. 11 illustrates a section which in simplified form corresponds essentially to a section XI—XI, indicated in FIG. 9, when the pulleys 4, 7 are joined together. The lug 98 is situated in a central position M between the side surfaces 93, 94 and between the permanent magnets 17, 95. The lug 98 is kept in this central position M by the mutually repelling magnet pair 16, 17 and 95, 101. When a torque is transmitted by the belt pulley 4 to the pulley 7, the lug 98 leaves the central position M and passes, for example, into a driving position A or A' (depending on the driving direction). In this position A or A' the magnet pair 16, 17 and 95, 101 have approached each other or are at a greater distance from each other. This causes an increased mutual repulsion between the approaching magnets. The magnet pair 16, 17 and 95, 101 are prevented from striking against each other by stops 105, which are illustrated in FIG. 11. At a high torque, the lug 98 of the pulley 7 is therefore able to bear against the pulley 4 with the interposition of two opposite stops 105. In this case, the transmission of torque is direct. In order to damp idling vibrations or vibrations which are superimposed on the driving rotation which do not exceed the maximum torque that can be transmitted by the magnet forces, there are in both directions of rotation d, d' clearances 106, 107 of an identical width b or b'. The installation of magnet pairs of different strengths in a damping cell 108 makes it possible to obtain different damping effects in both directions of rotation d, d'. The maximum torque which can be transmitted by the action of just the magnets is therefore predetermined as a function of the direction of rotation.

FIG. 12 shows, schematically the arrangement of an angular gear mechanism 110 in a vehicle 111. The angular gear mechanism 110 is arranged between an internal combustion engine 112 and a fan 113. The internal combustion engine 112 is installed transversely with respect to a direction of travel F between front wheels 114, 115 of the vehicle 111. A first belt pulley 4 of the angular gear mechanism 110 is driven by means of a belt 3 via a belt pulley 116, which is connected to a crankshaft of the internal combustion engine 112. The belt pulley 4 is mounted in a vibrationally damped manner on a first shaft 117 of the angular gear mechanism 110. The first shaft 117 drives a second shaft 118 to which a belt pulley 7 is connected in a rotationally fixed manner. The belt pulley 7 is connected to a belt pulley 119 via a belt 120. The belt pulley 119 directly drives a fan wheel 121 of the fan 113. An air flow produced by the fan wheel 121 acts on a radiator 122.

FIG. 13 shows a sectional illustration of a further angular gear mechanism 110. A first essentially cylindrical housing part 123 is fastened to a body part (not shown), an auxiliary support or an engine block. This cylindrical housing part 123 holds, via a roller bearing pair 124a, 124b, a shaft 117 which bears at one of its ends a conical gearwheel 125. The conical gearwheel 125 is directly connected to a second conical gearwheel 126. The conical gearwheel 126 is seated on an end of a shaft 118. The shaft 118 is mounted on both sides in a second housing part 127 by means of bearings 128, 129a, 129b. A belt pulley 7 is fastened to shaft 118 which lies opposite the conical gearwheel 126. Said belt pulley bears a belt 120 for driving the auxiliary assembly (not illustrated), in particular a fan. The housing part 123 is closed by a cover 130 on the side which lies opposite the conical gearwheel 125. The free end of the shaft 117 penetrates and protrudes from this cover 130. A flange 132 which has a hub 131 and is closed by a cover 133 is fitted on the protruding shaft 117. The flange 132 is secured via a screw 135 which engages a threaded hole 134 placed in the axial center of the shaft 117. The hub 131 of the flange 132 has, on its inside diameter, a groove 136 which extends in the axial direction. The shaft 117 likewise has, on its outside diameter, a groove 137 which corresponds thereto. A wedge 138 is inserted between the two grooves 136, 137 and brings about a fixed rotational connection of the flange 132 to the shaft 117 and therefore to the conical gearwheels 125, 126 and to the belt pulley 7. A bearing pair 139, on which a belt pulley 4 is mounted, sits on the outside diameter of the hub 131. Said bearing pair drives a belt (not illustrated) which is directly connected (not illustrated) to a belt pulley fitted on a crankshaft end of an internal combustion engine. Belt pulley 4 has a planar flange surface 141 at least on its side which faces an inner flange surface 140 of the flange 132, of the belt pulley 4. The two flange surfaces 140, 141 bear the same number and size of permanent magnets 16, 17 on circular paths of equal diameter and in circular paths at the same pitch. The permanent magnets 16, 17, preferably have a round cross section toward the flange surfaces 140, 141, are secured against axial displacement by insertion into recesses 18, 19 of the opposite flange surfaces 140 of the flange 132 and 141 of the belt 15 pulley 4. An air gap is disposed between the opposite surfaces of the permanent magnets 16, 17, so that the flange 132 and the belt pulley 4 can rotate in the same direction in a contact-free manner, and can transmit torques corresponding to the entire magnetic force. The permanent magnets 16, 17 are arranged on the flange surfaces 140 and 141 alternately as north pole-south pole-north pole-south pole, preferably with north poles and south poles facing each other in each case. In addition, stud bolts 143 which bear metal rings 144 are inserted into the flange surface 141 of the belt pulley 4, and are disposed on a different circular path from the circular path for the permanent magnet 17. These rings 144 or the stud bolts 143 can be provided with an elastic ring 145. The flange surface 140 of the flange 132 has circular-arc-shaped grooves 146 on a corresponding circular path. The circular-arc-shaped grooves 146 have an arc length which corresponds approximately to twice the diameter of one of the stud bolts 143 or approximately to twice the outside diameter of a metal ring 144 or approximately to twice the outside diameter of an elastic ring 145. The stud bolts 143 are disposed in the circular-arc-shaped grooves 146. However, as long as the overall magnetic force of the permanent magnets is sufficient for the transmission of the torque, said stud bolts are situated in a central position in the circular-arc-shaped grooves 146 where they oscillate without engaging the arc shaped grooves by the damping of the torsional vibrations provided by the permanent magnets 16, 17.

The function of the angular gear mechanism 110, as described in FIG. 13, with the torsional vibration damper can be described as follows: one end of a crankshaft of an internal combustion engine is provided with a belt pulley driving the belt pulley 4 of the angular gear mechanism 110 via a belt. The overall magnetic force of the permanent magnets 17 in the flange surface 141 of the belt pulley 4 and of the permanent magnets 16 in the flange surface 140 of the flange 132 transmit a torque which is approximately between 50% and 85% of the maximum torque transmitted to the shaft 117 in a contactless manner. This torque is transmitted to the belt pulley 7 via conical gearwheels 125, 126 and the shaft 118. Until the maximum of this partial-load torque is reached, the stud bolts 143 together with their additional rings 144, 145 remain out of contact. If the partial-load torque, for which the overall magnetic force resulting from the overall number of permanent magnets is dimensioned, the stud bolts 143 and their rings 144, 145 are brought in contact against the ends of the annular arcs of the grooves 146. The stud bolts 143 then accept the transmission of torque which occurs briefly that exceeds the overall magnetic force.

The invention is not restricted to exemplary embodiments which have been illustrated or described. On the contrary, it comprises developments of the invention within the scope of the patent claims. In particular, the invention makes provision for all types of magnets, in particular solenoids, to be used in the device. In accordance with the invention an auxiliary assembly or propeller transmission which is connected downstream to a device according to the invention is to be understood to be within the context of the invention.

LIST OF REFERENCE NUMBERS

1 Device
2 Auxiliary assembly
3, 3', 3" Belt
4 Driving belt pulley
5 Rolling bearing/ball bearing
6 Rolling bearing/ball bearing
7 opposite pulley/driving belt pulley
7' Belt pulley
8 Flange
9 Drive shaft of 2
10 Clamping cone
11 Clamping screw
12 Flange surface of 7
13 Flange surface of 4
14 Axis of rotation of 1
15 Circular path on 12, 13
15'Circular path on 12, 13
16 Permanent magnet on 7

17 Permanent magnet on 4
18 Depression in 7
19 Depression in 4
20 South pole of 16
21 North pole of 17, 25
22 Carry-along connection
23 Groove
24 Threaded hole
25 Rubber ring
26 Bolt
27 End surface of 23
28 End surface of 23
29 Side
30 Cover
40 Support
41 First end of 40
42 Hub
43 Second end of 40
44 Hole in 4
45 Bearing in 44
46 Clamping screw
47 Jam nut
48 Air gap
60 Belt
61 Axle stub
62 Flange for 61
70 Engine output shaft
71 Input shaft
72 Partial pulley of 7
73 Partial pulley of 7
74 Edge region
75 Screw
76 Flange surface of 7
77 Flange surface of 4
78 South pole of 17
79 Air gap
80 Damping unit
81 Damping unit
82 North pole of 16, 101
90 opening in 4
91 Circular ring
92 Radial
93 Side surface of 90
94 Side surface of 90
95 Permanent magnet
96 Active surface of 17
97 Active surface of 17
98 Lug on 4
99 Side surface of 98
100 Side surface of 98
101 Permanent magnet
102 Active surface of 16
103 Active surface of 101
104 Torus
105 Stop
106 Clearance
107 Clearance
108 Damping cell
110 Angular gear mechanism
111 Vehicle
112 Internal combustion engine
113 Fan
114 Front wheel of 111
115 Front wheel of 111
116 Belt pulley
117 Shaft of 110
118 Shaft of 110
119 Belt pulley
120 Belt
121 Fan wheel
122 Radiator
123 Housing part
124a, 124b Roller bearing pair
125 First conical gear wheel
126 Second conical gear wheel
127 Housing part
128 Bearing
129a, 129b Bearing
130 Cover
131 Hub
132 Flange
133 Cover
134 Threaded hole
135 Screw
136 Groove in 131
137 Groove in 117
138 Wedge
139 Bearing pair
140 Inner flange surface
141 Planar flange surface
142 Flange
143 Stud bolt
144 Ring
145 Elastic ring
146 Circular-arc-shaped groove

What is claimed is:

1. A device (1) for damping torsional vibrations having a driving component (4) and a driven component (4, 7), separated by an air gap in which magnets (16, 17, 95, 101) opposite each other are disposed on the drive component and the driven component and in which the torsional capacity of the driving component and driven component (4, 7) with respect to each other is limited wherein the improvement comprises the arrangement of the magnets (16, 17) disposed on respective substantially flat confronting surfaces on a drive component and a driven component separated by an air gap said arrangement of magnets disposed in axial alignment in a first substantially circular path (15) and an intermittently contactable carry along connection disposed in a separate second substantially circular path (15') axially and radially displaced from said magnets (16, 17).

2. The device as claimed in claim 1, wherein said drive component and said driven component (4, 7) have disk-shaped flange surfaces (12, 13; 140, 141) and said intermittently contactable carry along connection includes a cushion device between interacting parts.

3. The device as claimed in claim 1 or 2 wherein magnets (16, 17, 95, 101) are disposed opposite each other such that a north pole is disposed opposite a south pole in a contact-free and friction-free manner.

4. The device as claimed in claim 2 wherein idling and/or partial-load torques are accommodated by individual magnets (16, 17, 95, 101).

5. The device as claimed in claim 1 wherein full-load torques or peak torques are accommodated by said intermittently contactable carry alone connection (22).

6. The device as claimed in claim 1 wherein said intermittently contactable carry along connection 22 includes a driver (26, 143) for engaging a recess (23, 146).

7. The device as claimed in claim 1 wherein said magnets (16, 17, 95, 101) are disposed in planes (E, F) which are perpendicular to the axis of rotation (14) of the device (1).

8. The device as claimed in claim 1 wherein said magnets (16, 17, 95, 101) are disposed in planes (G, H, I, J) to the axis of rotation (14) of the device (1).

9. The device as claimed in claim 1 wherein said magnet pairs (16, 17; 95, 101) face and attract each other full on in a neutral central position (M) when said drive component and said driven component are not subjected to a load.

10. The device as claimed in claim 1 wherein when said magnets (17, 95) of the pulley (4) face the magnets (16, 101) of the pulley (7) with the same poles facing each other said magnets by a repelling action, push the pulley (7) into a neutral central position (M).

11. The device as claimed in claim 1 wherein a play (b, b') of said intermittently contactable carry-along connection (22), which limits the torsional capacity of the two components (4, 7), is dimensioned to allow the magnet pair (16, 17; 95, 101) of the damping unit (81, 82) or the damping-cell (108) to provide a maximum restoring force, in the direction of the central position (M).

12. The device as claimed in claim 1 wherein at least one device (1) is connected to an angular gear mechanism (110).

13. The device as claimed in claim 12 wherein the angular gear mechanism (110) is arranged between an internal combustion engine (112) and an additional assembly (121).

14. The device as claimed in claim 1 wherein said magnets (16, 17, 95, 101) which lie opposite each other transmit a torque acting on the driving component (4 or 7) entirely to the driven component (7 or 4).

15. The device as claimed in claim 1 wherein said magnets (117, 16) are disposed on flange surfaces (12, 13) on a first outer circular path (15) on said drive component and said driven component and said intermittently connectable carry along connections (22) are disposed on a further inner circular path (15') said circular paths (15, 15') running concentrically with an axis of rotation (14) of the device (1).

16. A device for dampening torsional vibrations having a driving component (4) and a driven component (7) with flange surfaces (12, 13; 140, 141) oriented parallel to each other and having magnets (16, 17, 95, 101) disposed opposite each other in which torque and damping of torsional vibrations is provided by magnets and the torsional capacity of the driving component and driven component is limited wherein the improvement comprises a substantially flat driving component (4) having a protruding lug (98) or an opening (90) curved concentrically to an axis of rotation (14) to form a first portion of a carry along connection, said substantially flat driving component (4) having magnets (17, 95) disposed on side surfaces and a substantially flat driven component (7) having a protruding lug (98) or an opening 90 curved concentrically to an axis of rotation (14) to form a second portion of said carry along connection said substantially flat driven component (7) having confronting magnets (17, 95) disposed on side surfaces (99, 100) to maintain said protruding lug (98) in its central position M.

17. The device for dampening torsional vibrations of claim 16 further comprising an elastic casing encasing said protruding lug (98).

18. The device for dampening torsional vibrations of claim 16 further comprising an angular gear mechanism (110).

19. The device for dampening torsional vibrations of claim 18 wherein said angular gear mechanism (110) is disposed between an internal combustion engine (112) and an additional assembly.

20. The device for dampening torsional vibrations of claim 18 wherein said additional assembly is a fan.

21. A device for dampening torsional vibrations having a driving component (4) and a driven component (7) having magnets (16, 17, 95, 101) disposed on said driving component and said driven component separated by an air gap and having a device for limiting the torsional capacity of said driving component (4) and said driven component (7) wherein the improvement comprises a substantially flat driving component 4 and a substantially flat driven component 7 having magnets disposed in a first substantially circular path and a carry along connection having an elastic casing and disposed in a second substantially circular path and an angular gear mechanism.

* * * * *